Jan. 13, 1953     A. W. BAER, JR     2,625,506
WATER HEATER AND STILL
Filed June 16, 1948
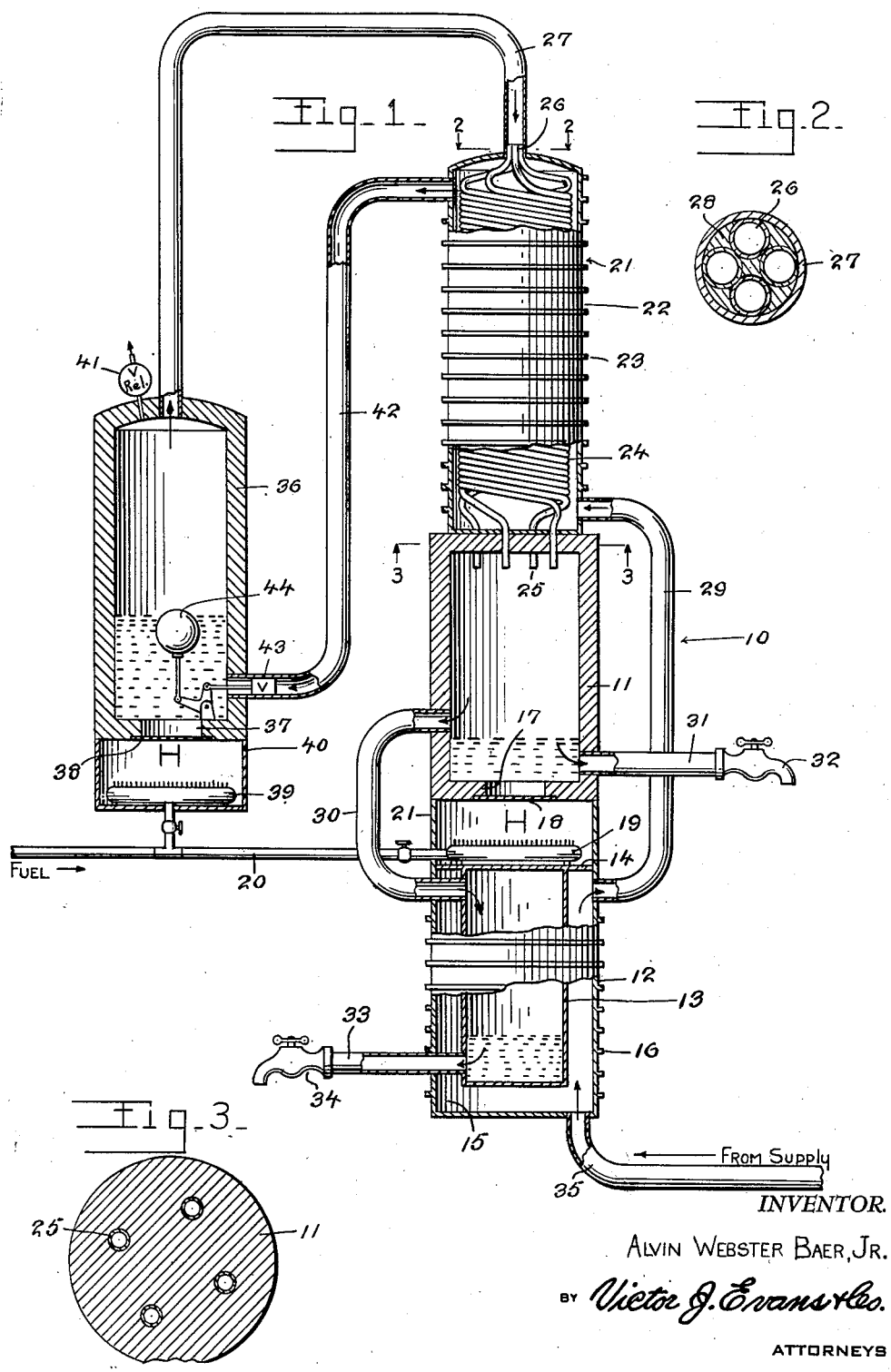
INVENTOR.
ALVIN WEBSTER BAER, JR.
BY *Victor J. Evans & Co.*
ATTORNEYS

UNITED STATES PATENT OFFICE 2,625,506

WATER HEATER AND STILL

Alvin Webster Baer, Jr., Santa Monica, Calif.

Application June 16, 1948, Serial No. 33,258

1 Claim. (Cl. 202—196)

This invention relates to a combination water heater and purifier wherein the purifying of the water is accomplished by vaporizing the water as supplied in the conventional water mains, and then condensing the steam which then becomes distilled water.

An object of this invention, therefore, is to provide a device of this character that distills the usual household water to provide pure $H_2O$ free from water borne bacilli.

The distilled water will be soft and free from minerals which are usually found in hard water. The water thus softened by distillation makes washing and bathing cleaner and easier. This method of softening and purifying the water eliminates the use of chemicals to permit this process.

Another object of the invention is to provide a device of this character that is simple in construction and operation, and will efficiently perform the task for which it has been designed.

With the above and other objects and advantages in view, the invention consists of the novel details of construction, arrangement and combination of parts more fully hereinafter described, claimed and illustrated in the accompanying drawing in which:

Figure 1 is an elevational view, partly in section and partly broken away, of an embodiment of the invention;

Figure 2 is an enlarged sectional view on the line 2—2 of Figure 1, and

Figure 3 is an enlarged sectional view on the line 3—3 of Figure 1.

Referring more in detail to the drawing, the reference numeral 10 embodies the water heater and purifier which is constructed in accordance with the invention.

The heater and purifier 10 comprises an insulated hot water tank 11, which is positioned immediately above and in line with the cold water tank 12. The tank 12 comprises the storage tank 13 which depends from, and is formed integral with, a partition 14 in the tank 12 directly below the bottom of the hot water tank 11. The space 15 between the tank 12 and the tank 13 comprises a water jacket which cools the contents of the tank 13 and the exterior of the tank 12 has the externally located cooling ribs 16 formed thereon integral therewith.

The bottom of the tank 11 is provided with a central opening 17 closed by the heat induction plate 18 located directly above the heating element 19. The heating element 19 is supported by the partition 14, and is connected to the supply line 20 extending outwardly of the heating chamber 21 formed between the partition 14 and the bottom of the tank 11.

The water in the tank 11 is, therefore, maintained within a definite heat range, by the heating element 19, which can be controlled by a thermostat, not shown.

Positioned on the tank 11, in alinement therewith, is the condensing unit 21, comprising the tank 22, having the externally located cooling ribs 23 formed thereon, and the condensing coils 24 positioned therein.

The coils 24 are interwoven coils with the lower ends 25 of the coils passing through the top of the tank 11 and ending shortly below the inner surface of the tank 11. The upper ends 26 of the coils 24 end in the conduit 27 and are retained in their proper relation to each other by the apertured plate 28 carried by the conduit 27.

The tank 22 of the unit 21 is in communication with the space or water jacket 15 by means of the conduit 29, and the tank 11 is in communication with tank 13 by the conduit 30.

An outlet pipe 31 having communication with the household hot water faucet depicted by 32 at one end communicates with the tank 11 at its other end. An outlet pipe 33 having communication with the household cold water faucet depicted by 34 at one end, on its opposite end communicates with the tank 13. Communicating with the water jacket 15, within the tank 12, is the household water supply line 35, which is connected to the conventional water supply inlet, not shown.

The conduit 27, as stated, receives at one end, the coils 24 of the unit 21 and at its opposite end, communicates with the insulated steam boiler 36 which, like the tank 11, is provided with a central opening 37 closed by the heat induction plate 38 located directly above the heating element 39. The heating element 39 is supported within the heating chamber 40 directly below the boiler 36, and is also connected to the supply line 20 extending outwardly of the chamber 40.

The boiler 36 is provided with a safety relief valve 41, and the boiler is in communication with the tank 22 of the condensing unit 21 by means of the conduit 42. A valve 43 in the conduit 42 is operated by the float 44 mounted within the boiler 36 and controlled by the water level therein.

In operation, the water within the boiler 36 is heated by the heating element 39. The water in the hot water tank 11 and cold water tank 13 is maintained at normal house pressure, which is maintained by the water from the supply line 35. Therefore, the pressure in the boiler 36 is maintained within a safe pressure by the relief valve 41 which is set above operating pressure. Therefore, the pressure in the boiler 36 is maintained at approximately the same pressure by the heating element 39 operated by means not shown, which is caused to be operated by the changes in the pressure in the boiler 36. It is to be noted that the heating element 19 is thermostatically controlled by the temperature of the water in the tank 11. The heating element 39 is pressure controlled by the pressure in the boiler 36.

The steam passing from the boiler 36 to the condensing unit 21 by means of the conduit 27 passes through the coils 24 which are cooled by the water from the jacket 15 which passes into the tank 22 by means of the conduit 29. The cooling ribs 23 also aid in cooling the water in the tank 22.

The steam within the coils 24 is condensed by the action of the cool water in the tank 22, and the longer period of non-use of the condensed steam, the greater amount of distilled water formed by the condensing unit.

The distilled water leaves the coils 24 to enter tanks 11 and 13, from either of which it can be drawn through conduits 31 or 33 when needed for household use.

Where water is used from the tanks 11 and 12, at their maximum rate of discharge, two methods can be used for the proper functioning of the entire unit during this condition.

In the first method, the condensing unit can be designed so that when a certain low water level is reached in the condenser coils 24, the rate of water condensation will equal the rate of water leaving the hot and cold water supply tanks 11 and 12. The water jacket and cooling tanks and the ribs formed thereon can be designed so that in this condition of maximum rate of flow, the supply of the water in the tanks is maintained and their temperatures are kept within a satisfactory range.

In the second method of operation, a condensing unit 21 is designed whose maximum rate of condensation is less than the maximum rate of flow from the supply tanks 11 and 12. In this event, when a certain low level in the tanks 11 and 12 is reached, a float operated valve in either or both of the outlet lines 31 and 33 will close, stopping the discharge from the tank until a sufficient water level is reached in each respective tank.

This procedure is necessary to prevent steam from leaving the unit through the outlet lines 31 and 33 when the supply of water in the tanks is low.

If the unit were designed as stated in the first method, the hot water supply could not be exhausted as happens occasionally with the present day hot water heaters.

There has thus been provided a heating and purifying unit which, it is believed, will accomplish the objects of the invention, and it is also believed that the operation and construction of the unit will be apparent to those skilled in the art.

It is also to be understood that changes in the minor details of construction, arrangement and combination of the various parts may be resorted to, provided they fall within the spirit of the invention and the scope of the appended claim.

Having thus described the invention, what is claimed as new and desired to be secured by Letters Patent is:

A device of the character described, comprising a boiler having a low water level therein, a hot water tank, a cold water tank positioned immediately below and in line with the hot water tank and a condensing unit positioned immediately above and in line with the hot water tank, a conduit connecting said boiler to said condensing unit, to conduct steam from said boiler to said unit, condenser coils in said condensing unit, and the lower ends of the coils terminating within the hot water tank and the upper ends of the coils terminating in the conduit connecting said boiler to said condensing unit, a conduit connecting said boiler below the low level water mark to said condensing unit, to conduct cold water to said boiler, a conduit connecting said condenser unit to said cold water tank for the cooling of said condenser, a storage tank in said cold water tank, a conduit connecting said hot water tank with the storage tank in said cold water tank to conduct water from said hot water tank to said storage tank, outlet means for said storage, hot water tanks and heating means for said boiler and said hot water tank, relatively spaced annular cooling ribs on said cold water tank and said condensing unit, and a float controlled valve mounted in the conduit connected to the boiler from the condensing unit below the low water level in said boiler.

ALVIN WEBSTER BAER, Jr.

REFERENCES CITED

The following references are of record in the file of this patent:

UNITED STATES PATENTS

| Number | Name | Date |
|---|---|---|
| 346,221 | Rankin | July 27, 1886 |
| 448,041 | Hunting | Mar. 10, 1891 |
| 532,390 | Nagel | Jan. 8, 1895 |
| 782,377 | Beers | Feb. 14, 1905 |
| 783,942 | Forbes | Feb. 28, 1905 |
| 823,488 | Barnstead | June 12, 1906 |
| 849,210 | Daley et al. | Apr. 2, 1907 |
| 851,045 | Ullrick | Apr. 23, 1907 |
| 901,645 | Perry | Oct. 20, 1908 |
| 961,254 | Perlee | June 14, 1910 |
| 1,069,829 | Thoens | Aug. 12, 1913 |
| 1,275,000 | Dodge | Aug. 6, 1918 |
| 1,276,025 | Buscher | Aug. 20, 1918 |
| 1,369,438 | Jewell | Feb. 22, 1921 |
| 1,635,112 | Carlson | July 5, 1927 |
| 2,074,350 | Wood | Mar. 23, 1937 |